(12) United States Patent
Konfrst

(10) Patent No.: US 7,242,122 B2
(45) Date of Patent: Jul. 10, 2007

(54) LOW SPEED DISCOIDAL ELECTRIC MOTOR

(76) Inventor: Ing Václav Konfrst, Mosteeka 3184, 272 01 Kladno (CZ)

( * ) Notice: Subject to any disclaimer, the term of this patent is extended or adjusted under 35 U.S.C. 154(b) by 0 days.

(21) Appl. No.: 11/610,576

(22) Filed: Dec. 14, 2006

(65) Prior Publication Data

US 2007/0085430 A1    Apr. 19, 2007

Related U.S. Application Data

(63) Continuation of application No. 11/046,951, filed on Jan. 31, 2005, now abandoned.

(30) Foreign Application Priority Data

Jun. 24, 2004    (CZ) .................................. 2004-758

(51) Int. Cl.
*H02K 7/00*    (2006.01)
*H02K 1/00*    (2006.01)
*H02K 29/00*    (2006.01)
*B60K 7/00*    (2006.01)

(52) U.S. Cl. .................. 310/75 C; 310/67 R; 310/254; 310/268; 180/65.5

(58) Field of Classification Search .............. 310/75 C, 310/67 R; 180/65.5
See application file for complete search history.

(56) References Cited

U.S. PATENT DOCUMENTS

| | | | |
|---|---|---|---|
| 3,344,325 A | 9/1967 | Sklaroff | |
| 4,315,171 A | 2/1982 | Schaeffer | |
| 4,547,713 A | 10/1985 | Langley et al. | |
| 5,175,462 A | 12/1992 | Yoshino et al. | |
| 5,272,938 A * | 12/1993 | Hsu et al. .................. | 74/594.1 |
| 5,334,898 A | 8/1994 | Skybyk | |
| 5,450,915 A * | 9/1995 | Li ............................. | 180/65.5 |
| 5,581,136 A * | 12/1996 | Li ............................. | 310/67 R |
| 6,092,615 A * | 7/2000 | Pusch et al. ............... | 180/65.5 |
| 6,278,216 B1 | 8/2001 | Li | |
| 6,849,982 B2 | 2/2005 | Haydock et al. | |
| 6,911,757 B2 | 6/2005 | Lopatinsky et al. | |

FOREIGN PATENT DOCUMENTS

JP    61035145    2/1986

* cited by examiner

*Primary Examiner*—Burton Mullins
(74) *Attorney, Agent, or Firm*—Cermak & Kenealy, LLP; Adam J. Cermak

(57) ABSTRACT

An electric motor has a dimensional arrangement of both the rotor and stator even at high level of torques that eliminates a flip-flop effect, which is typical for conventional step motors. Stator segments (3), on which coils (4) are placed, making up the poles of the motor, are compensated and are neutral from the point of view of forces $F_{Fe}$. The arrangement satisfies simultaneously a number of interrelationships including the number and design engineering arrangement of the permanent magnets of the rotor (2), the number and design engineering arrangement of the stator segments (3) made from soft magnetic material, the number of the motor phases, and the number and position of stator coils (4) that make up the poles of the motor installed on every segment (3) depending on the number of motor phases.

4 Claims, 2 Drawing Sheets ic permeability and the coils (4) of the stator, which is the subject matter of the invention.

LOW SPEED DISCOIDAL ELECTRIC MOTOR

This application is a Continuation of, and claims priority under 35 U.S.C. § 120 to, U.S. application Ser. No. 11/046,951, filed 31 Jan. 2005 now abandoned, the entirety of which is incorporated by reference herein, and claims priority under 35 U.S.C. § 119 to Czech Republic application number 2004-758, filed 24 Jun. 2004.

FIELD OF INVENTION

The present invention relates to a light, low-speed multipole discoidal electric motor. In particular, the present invention relates to a light, low-speed multipole discoidal electric motor which can be configured, for example, for driving collapsible wheel chairs for physically handicapped people.

BACKGROUND OF THE INVENTION

Low-speed driving units utilizing an electric motor drive are well known in the prior art. The torque of such low-speed driving units, measured on the outlet shaft at rated speed, lies within the range of units per second as being of an order 100 Nm and has been characterized by a design feature based on a standard high-speed electric drive equipped with a gearbox. However, this part of the wheel proves to have the highest failure mode.

The operation of an advanced driving mechanism requires the development of a contactless electric motor without a gearbox to be maintenance free for the whole lifetime.

In Czech patent application 1480-97 A3 to Nicolas Wavre of Neuchatel, CH, Wavre—describes a synchronous motor with permanent magnets and fitting coils into a top land, where the coils are slid on the teeth with the axes oriented to the centre of the motor, which are connected by means of a magnetic yoke. However, in Wavre's disclosure, it is not possible to attain necessary weight and performance parameters.

Czech patent CZ 279 581 B6 (registrant the Institute of Thermo-technology of Academy of Sciences of the Czech Republic (stav termotechniky AVR), Prague, CZ) discloses a machine with a diameter greater than one meter by applying a principle of two rotors, one of them being equipped with magnets whereas the other has pairs of pole shoes with coils slid on. This device can be used for the purpose of a light motor with a large diameter. However, it is obvious that this arrangement cannot be used as a drive, due to an uncompensated flip-flop effect resulting in the generation of vibrations.

Czech patent CZ 291897 B6, dated 2001, discloses that conventional motors with gearboxes can be replaced by motors without gearboxes based on FeNdB magnets placed on the rotor and with stator coils wound on a continuous circular ring made from soft magnetic material, e.g., ferrite, where starting torque may be increased by increasing the radius of the position of the electric motor functional elements. This engineering design solution is technologically limited to diameters up to 300 mm. Because of the technological limitations regarding the manufacture of the ring made from soft magnetic material, this solution cannot be applied to the manufacture of the motors with the light design engineering features without a gearbox whose diameter exceeds 500 mm, with the width being a few centimeters and with the starting torque being an order 100 Nm, and with a ratio of motor diameter to the motor thickness greater than 15.

SUMMARY OF THE INVENTION

Accordingly, one aspect of the present invention includes providing an advanced driving mechanism having a contactless electric motor without a gearbox.

Another aspect of the present invention includes providing an advanced driving mechanisms which can be maintenance free for the whole lifetime.

Yet another aspect of the present invention includes providing a low-speed discoidal electric motor.

Additional aspects, advantages, and novel features of the invention will be set forth in part of the description which follows, and in part will become apparent to those skilled in the art upon examination of the following specification or may be learned by practice of the invention.

These and other aspects are achieved by providing a low-speed discoidal electric motor with permanent magnets that are fitted on the rotor and with the coils located on the stator.

BRIEF DESCRIPTION OF THE DRAWINGS

The present invention will be better understood with reference to the appended drawing sheets, wherein.

DETAILED DESCRIPTION OF EXEMPLARY EMBODIMENTS

Figure 1:
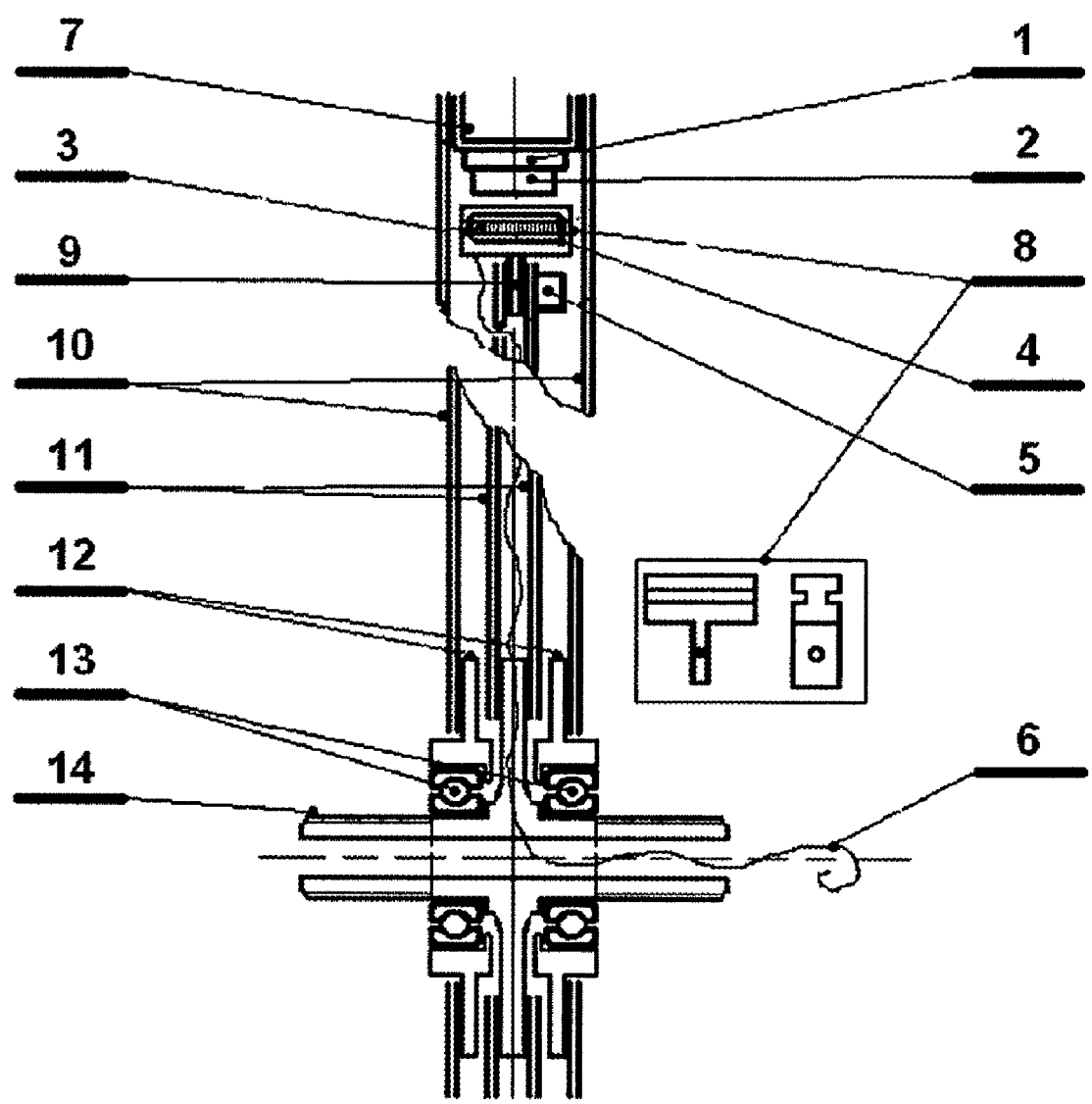
FIG. 1 is an elevated side cross-sectional view of the low speed discoidal electric motor of the present invention, the cross section passing through the axis of the electric motor.

Referring now to the drawings, the aforementioned shortcomings and insufficiencies are removed to a considerable extent by providing a low-speed discoidal electric motor with permanent magnets (2) that are fitted on the rotor and with the coils (4) located on the stator. In general terms, an aspect of the invention includes a low-speed electric motor of lightweight construction with rotor diameter greater than 500 mm, its width of a few cm, without a gearbox, with starting torque being of an order 100 Nm, makes use of the principle of Coulomb forces. The stator coils (4), making up the poles of the motor, are positioned on large diameter segments that have the form of a circle section made from soft magnetic material (3) that is simply and cheaply producible. Discrete elements in the motor with permanent magnets possessing a high level of magnetic reactance, with magnetic permeability, unless they have a spatial, dimensional arrangement that is the subject matter of this invention, generate flip-flop effects, i.e., transition skips of the magnets (2) caused by the spatial density of the magnetic flux generated by the shape of permanent magnets of the rotor (2) and the geometrical arrangement of the segments with magnetic permeability (3), together with the result of the sum of magnetic field intensity H of the coils (4) on the poles of the segments (15) in every position of the rotor relative to the stator.

One principle of the present invention involves a comprehensive engineering design arrangement of the active parts of the rotor, i.e., the rotor permanent magnets (2), the segments made from material of the stator (3) with magnetic permeability, and the dimensioning and positioning of the coils of the stator (4) that make up the poles of the motor, and ensures that they are neutral relative to the permanent magnet (2) in terms of force and magnetic field; i.e., they do not generate vibrations. In order to provide smooth motor operation and to eliminate the generation of vibrations, the dimensions of segments—the sections of the ring (3) coinciding with the dimensional arrangement of the permanent magnets of the rotor (2), together with dimensional arrangement of the coils of the stator (4), must simultaneously satisfy all the following geometric spatial arrangement relationships:

1) Number of the permanent magnets of the rotor (2) must be even.
2) Outer cylindrical surface of the segments of the stator, made from soft magnetic material (3), has identical distance from the surface of every permanent magnet (2) in every position of the rotor, relative the stator. The poles of the electric motor are made up by the coils of the stator (4) in the air gap.
3) The number of segments of the stator made from soft magnetic material (3) must not be commensurable with the number of permanent magnets of the rotor (2), that furthermore is defined as follows: the nearest higher, as well as the nearest lower, numbers are also not commensurable with the number of permanent magnets of the rotor (2) and both numbers, i.e., the nearest higher and nearest lower numbers, but by two must be commensurable with the number of permanent magnets of the rotor (2).
4) The number and positioning of the coils (4) on the segment (3) that make up the poles of the electric motor must satisfy the following relationships:
   1. The number of the coils (4) on the segment (3)=2× the number of phases of the motor×N (N=integer).
   2. Every phase of the motor must be represented on the segment (3) by an equal number of the coils (4)=number of poles of the motor phase.
   3. The number of the coils (4) on the segment of the stator made from soft magnetic material (3) must be a number commensurable with the number of permanent magnets of the rotor (2).
   4. The position of the coils (4) on the segment (3) must meet a condition for angular distribution on the stator irrespective of the dimensions and the distribution of the stator segments made from soft magnetic material (3):

Angle of coil fitting for $i$-th phase=(360/number of rotor permanent magnets)×(coil order+ $(i-1)/n_{motor\ phases}$)

$i$=integer in the interval 1 to $n_{motor\ phases}$
   $n_{motor\ phases}$=the number of motor phases For instance—for 48 permanent magnets, the following data meet the relations of spatial distribution for the elimination of parasite force impact that would cause vibrations:
   5. 10 segments made from soft magnetic material.
   6. 12 coils on every segment for a three-phase low-speed motor, or 24 coils for a six-phase low-speed motor.

Figure 2:
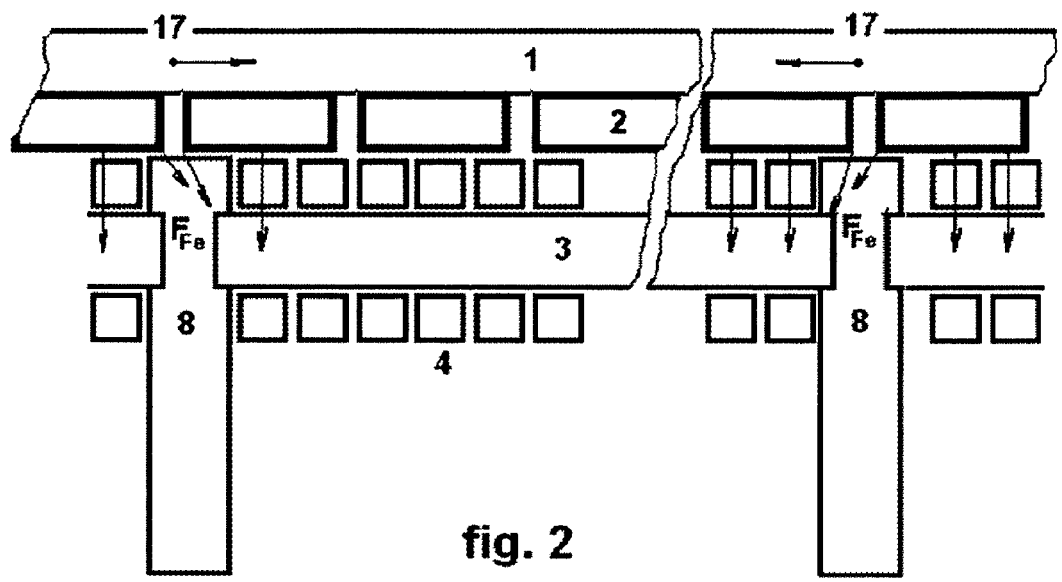
FIG. 2 depicts the origin of the parasite forces $F_{Fe}$ and the engineering design of the segments of the low-speed discoidal electric motor of the present invention.
Figure 3:
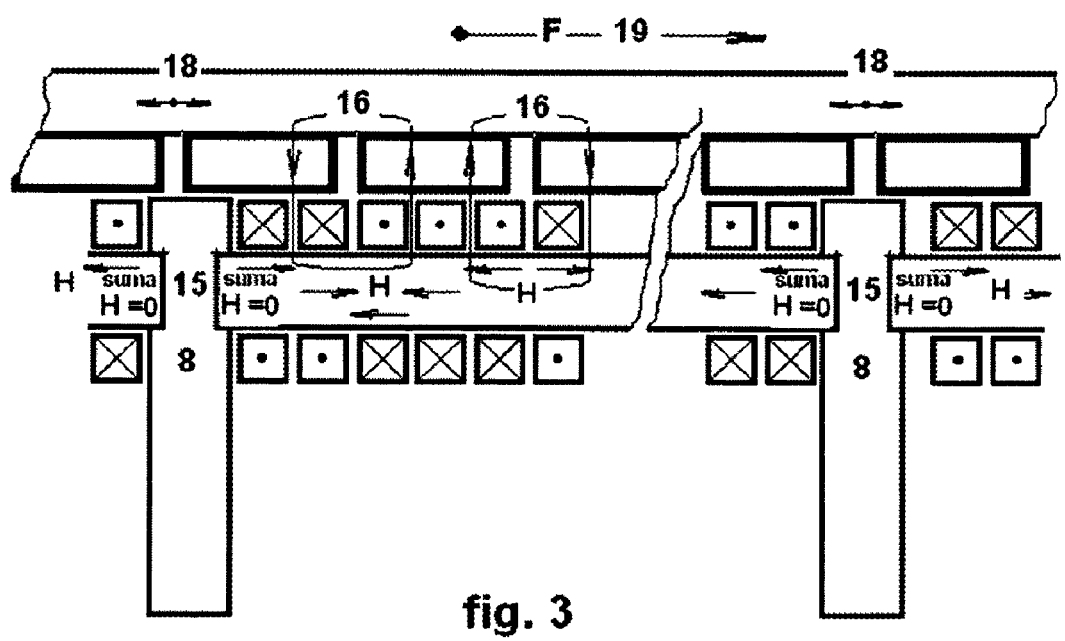
FIG. 3 depicts the magnetic field of the permanent magnets that are coincident with the magnetic field H of the coils of the low-speed discoidal electric motor of the present invention.

FIG. 2 clarifies the origin of the parasite forces $F_{Fe}$ with the resultant forces (17) that are generated by permanent magnets (2) and the engineering design of the segments made from soft magnetic material (3) and the substance of their elimination, as it has been described in the foregoing items 1, 2 and 3. FIG. 3 characterizes the magnetic field (16) of permanent magnets (2) that, in coincidence with magnetic field H of the coils (4), induces an active force F (19) on the circumference of the motor and contemporaneously illustrates the substance of the origin of the parasite forces due to the action of the sum of magnetic intensity $\Sigma H$ of the individual coils (4)—poles of the electric motor inside of the stator segment (3), so that in case of not fulfilling the condition $\Sigma H=0$, induces on the poles (15) of the segments (3) parasite forces (18) in coincidence with magnetic force lines (16) of the permanent magnet of the rotor (2), whose conditions of elimination are presented in the above-identified item 4.

EXAMPLE OF THE INVENTION

The low-speed discoidal electric motor (FIG. 1) is made up of a stator and a rotor. A load bearing structure of the rotor is designed from two rotor disks (10) made from light flexible material, e.g., duralumin(ium). Both rotor disks (10) are on the outer circumference and are mechanically linked by means of a wheel rim (7). The wheel rim (7) is intended for the creation of a box-type structure of a rotor sandwich arrangement. The wheel rim (7) serves, in the case of a wheelchair drive for physically handicapped people, for tire mounting. To the inner cylindrical part of the wheel rim (7) is connected a permanent magnets carrier (1) made from magnetic conducting material. The permanent magnets carrier (1) is of an annular ring shape. On the inner circular surface, permanent magnets are attached with a high level of residual induction (2). The rotor is mechanically linked to the stator by means of ball bearings (13). The ball bearings (13) are supported by bearing bushings (12). The bearing bushings (12) are mechanically linked to the rotor disks (10). The ball bearings (13) are pressed on a fixing hub (14) that is a part of the stator. To the aforementioned fixing hub (14) is attached a stator disk (11). The stator disk (11), having a light sandwich design, is made up of two pieces. On the circumference of the stator disk (11), spokes (8) are mounted intended for fixing segments (3) as shown in FIG. 1. The spokes (8) for fixing segments (3) are made from non-magnetic material. The segments themselves made from soft magnetic material (3) are set into the grooves of the spokes (8) made on the circumferential surface. The lower medium part of the spoke (8) is followed by a shank (9). By means of the shank (9), the spoke (8) for the fixing of the segments (3) is attached to the stator disk (11). The segment (3) of the magnetic shield is made from soft magnetic material, e.g., transformer sheets. On the segment (3) of the magnetic shield are attached the coils (4). The active parts of the coils (4) are in the air gap. The air gap is defined by the end-face of the permanent magnet (2) and the outer surface of the segment (3) of the magnetic shield. Thus, the active parts of the coils (4) are in the space through which magnetic flux of the permanent magnets (2) flows. The air gap is invariably the same in any position of rotor with regard to the stator. The poles of the stator are made up of the active parts of the coils (4) in the air gap. The number of the coils (4) underneath one permanent magnet (2) makes up the number of the phases of the motor. The relative position of every coil (4) with respect to a permanent magnet (2) is monitored by a position indicator (5). The coils (4) are fed with electric current lead-in wires (6) passing through hollow hub (14). The mechanical configuration of the active parts of the electric motor, i.e., the carriers (1) of the permanent magnets (2), the segment (3) of the magnetic shield including the design of the fixing into the spokes (8), the positioning of the coils (4) on the segment (3) of the magnetic shield, and the principle of assurance of the magnetic neutrality of a segment at the moment of connecting the coils to the voltage, is illustrated in detail in the FIGS. 2 and 3.

Description of the Motor Function

The permanent magnets (2) located along the whole inner cylindrical surface of the carrier (1) are the source of magnetic flux. The carrier (1) closes the magnetic circuit of the permanent magnets (2). On the inner side, the magnetic flux enters into the air gap defined by the internal cylindrical surface of the permanent magnets (2) and the external cylindrical surface of the annular ring (3) of the magnetic shield. The major part of the magnetic flux (16) (FIG. 3) generates, in the air gap, a magnetic induction and closes through the segment (3) of the magnetic shield. The leakage part of the magnetic flux closes in the space on the inner side of the segment (3) of the magnetic shield and on the outer side of the carrier (1) of the permanent magnets (2). After connecting an input power supply voltage to the feeding wire (6), an electric current begins to flow through the coils (4) (FIG. 3—the electric current flowing in one direction is indicated by the character X, whereas the electric current flowing in the opposite direction indicated by the character •). The magnetic flux (16) in the air gap generates, in coincidence with the magnitude and direction of the electric current flowing through that part of the winding of the coils (4) that are in the air gap, the required force F (19). The previously mentioned force F is that force being transferred through the wheel rim (7) to the circumference of the wheel of the, e.g., wheel chair.

The engineering design of the motor described herein, including a split stator divided into segments made from the soft magnetic material, generates, in the point of setting in the spoke (8), a non-homogeneous magnetic field (16) producing radial forces $F_{Fe}$ with the resultant force (17) having a variable magnitude according to the relative position of the stator and the rotor. The course of this force F depends on the relative position of the magnet and the axis of the spoke with the segments set in the grooves. Provided that an angle of the spoke axis (8) is a variable quantity and within the range from the beginning to the end of the magnet, the force (17) reaches positive values as far as the centre of the magnet, and negative values from the centre to the end of the magnet length, irrespective of the magnet polarity. By fulfilling the following conditions:
  1) The number of the permanent magnets of the rotor (2) must be even
  2) The number of the stator segments made from soft magnetic material (3) must be non-commensurable number/coprime number under conditions according to the above-identified item 3.

Compensation for the resultant force (17) occurs due to a uniform distribution of spoke axes relative to the distribution of the permanent magnets of the rotor—thanks to the method whose principle is illustrated in FIG. 2.

The condition of magnetic neutrality of the poles of the segments (3) must be fulfilled simultaneously, meaning that the resultant intensity of the magnetic field H of the individual coils (4) of every segment (3) must meet the condition $\Sigma H=0$ so that the poles (15) of the segment made from soft magnetic material (3) in the point of setting in the spoke (8) are neutral from magnetic point of view, and parasite forces (18) do not arise due to the coincidence of the magnetic flux (16) of the permanent magnets (2) and the magnetic flux of the segment (3).

Individual coils (4) that make up the poles of the motor and are connected to the phase of the motor winding, according to foregoing item 4, are switched to energize them depending on the position of the rotor relative to the stator so that radial force F (19) on the circumference of the motor may be produced. Provided that the motor construction satisfies the relationships according to the item 4 above, an even number of the coils (4) of the same phase of the motor always energizes one segment (3) which assures that the sum of particular components of the magnetic intensity H in every point of relative position of the rotor and stator meets the condition of magnetic neutrality ÓH=0 and no parasite forces (18) between the poles (15) of the stator segments (3) and the permanent magnets of the rotor (2) occur and the motor, even at low speed and high level of starting torques, runs smoothly.

EXAMPLE OF INDUSTRIAL APPLICATION

The invention can be utilized providing that it works as an advanced low-speed driving mechanism to drive light portable collapsible wheel chairs for physically handicapped people or if it works as a low-speed generator intended for the production of electricity.

While particular embodiments of the invention have been described, it will be understood, of course, that the invention is not limited thereto, and that many obvious modifications and variations can be made, and that such modifications and variations are intended to fall within the scope of the appended claims.

I claim:

1. A low speed discoidal electric motor useful for avoiding a flip-flop effect and vibrations, the motor comprising:
  a rotor; and
  a stator
  wherein said rotor comprises:
    a pair of rotor disks, a wheel rim, a carrier, a plurality of permanent magnets, a plurality of bearing bushings, and a plurality of ball bearings;
    wherein said pair of rotor disks includes a circumferential part mechanically connected to said wheel rim and a side surface of a near-centre part mechanically connected to said plurality of bearing bushings, said wheel rim being mechanically connected at an inner surface thereof to an outer surface of said carrier, wherein said carrier is mechanically connected at an annular undersurface thereof to an outer surface of said plurality of permanent magnets;
    wherein said plurality of bearing bushings are disposed on and rotatably connected to said plurality of bearings; and
  wherein said stator comprises:
    a pair of stator disks, a fixing hub having a radially projecting part, a plurality of shanks, a plurality of spokes having grooves, a plurality of segments, a plurality of stator coils, a plurality of lead-in wires, and a plurality of position indicators;
    wherein said pair of stator disks includes a near-centre part having a side surface mechanically connected to a side surface of the radially projecting part of said fixing hub, and mechanically and fixedly connected at a side surface of a near-circumference part of the stator disks to said plurality of shanks, said plurality of shanks being mechanically connected at an outer surface thereof to said plurality of spokes;
  wherein said plurality of position indicators are mechanically connected to said plurality of shanks;
  wherein said plurality of segments have longitudinal axes forming arcs of circle, all said arcs having the same radius, said segments stably set into corresponding grooves of said plurality of spokes such that a uniform air-gap is defined between inner surfaces of said plurality of permanent magnets and corresponding outer surfaces of said plurality of segments in any position of said stator relative to said rotor;

wherein each coil of said plurality of stator coils is wound and mounted on a respective segment of said plurality of segments;

wherein said plurality of bearings are sandwichingly disposed between said plurality of bearing bushings and said fixing hub; and wherein each coil of said plurality of stator coils is configured and arranged to be fed with electric current with a respective wire of said plurality of lead-in wires.

2. The low speed discoidal electric motor as claimed in claim 1, wherein each segment of said plurality of segments is made of soft magnetic material;

wherein each spoke of said pair of rotor disks is made of a light flexible material;

wherein said carrier is made of magnetic conducting material and comprises an annular ring shape;

wherein each spoke of said plurality of spokes is made of non-magnetic material; and wherein said plurality of stator coils form poles of said motor.

3. The low speed discoidal electric motor as claimed in claim 2, further comprising:

first means for compensating for and eliminating parasite forces $F_{Fe}$ with resultant parasite forces produced by a coincidence of magnetic effects of said permanent magnets and said segments, said first means comprising said permanent magnets and said segments; and wherein:

(i) the number of said permanent magnets is even;

(ii) the number of said segments of said stator is not commensurable with the number of said permanent magnets of said rotor;

(iii) the nearest higher number and the nearest lower number of said segments of said stator are not commensurable with the number of said permanent magnets of said rotor; and (iv) the second nearest higher number and the second nearest lower number of said segments of said stator are commensurable with the number of permanent magnets of said rotor.

4. The low speed discoidal electric motor, as claimed in claim 3, further comprising:

second means for compensating for and eliminating parasite forces which arise due to the coincidence of magnetic flux of the magnetic field of said permanent magnets and the magnetic flux of said segments, comprising permanent magnets, said segments, said stator coils, and the phase of said motor, wherein:

(i) the number of said coils on respective segments=2× the number of said phases of said motor x N, wherein N is an integer;

(ii) each phase of said motor is represented on a respective segment by an equal number of coils, which coils form poles of said electric motor;

(iii) the number of said coils on a segment is commensurable by the number of said permanent magnets of said rotor;

(iv) a position of any of said coils on any of said segments meets a condition for angular distribution on said, said condition being such that angle of coil fitting for the i-th phase=(360/number of permanent magnets)×(coil order+ (i−1)/$n_{motorphase}$), wherein i is an integer in the interval from 1 to up to $n_{motorphase}$, and $n_{motorphase}$=the number of motor phases, and (v) said motor and said connections of said lead-in wires to said coils are configured and arranged such that, as a result of (iv) above, an even number of said coils of the same phase are always on every said segment.

* * * * *